UNITED STATES PATENT OFFICE.

ARTHUR JUNGHANS, OF SCHRAMBERG, GERMANY.

METHOD OF SEGREGATION.

No. 903,725.

Specification of Letters Patent.

Patented Nov. 10, 1908.

Application filed July 10, 1905. Serial No. 269,140.

*To all whom it may concern:*

Be it known that I, ARTHUR JUNGHANS, a citizen of Würtemberg, residing at Schramberg, Germany, have invented certain new and useful Improvements in Methods of Segregation; and I do hereby declare the following to be a full, clear, and exact description of the invention, such as will enable others skilled in the art to which it appertains to make and use the same.

My invention relates to the segregation of the constituent elements of mixtures and particularly to the elimination of moisture in the process of manufacturing of articles, such as matches and the like.

I have discovered that, applying the principles of resonance, light-rays are an important factor in the separation of volatile ingredients, and, furthermore, that the efficiency of the rays for the purpose intended depends largely upon the choice of a light or other source from which the radiations will possess a definite wave length and periodicity adapted to the nature of the mixture to be treated and the character of the ingredient to be separated therefrom. By the employment of rays of a proper frequency and wave length, certain desired chemical and physical changes may be obtained in the article undergoing treatment and other undesirable changes avoided, the particular rays which are most valuable in one case, being less valuable in another.

Generally speaking, my discovery seems to bear close relation to the recognized phenomena connected with the sympathetic synchronous vibrations generated in one body by another through a suitable medium. As by the sounding of a certain note, sympathetic vibrations are set up in molecules of matter which synchronize with those of the note, so, as applied in the elimination of moisture, if rays of a proper wave length and frequency be projected upon articles containing moisture, a sympathetic vibration is set up in the water molecules which greatly hastens the process of evaporation.

By this improved method, the action of strong selected light rays, acting in synchronism with the molecular movement of the water content, will, by its sympathetic influence, cause a constantly increasing range of vibration and ultimate dissipation of the water molecules by evaporation, while the molecules of the other ingredients are unaffected, not having a rate of vibration corresponding with the particular light rays employed, and thus a perfect drying is obtained. In the same way the invention may be applied in the segregation of various articles, molecular vibration being set up or accelerated in certain constituent elements sensitive thereto, and not in others, the choice being within the election and control of the operator. The essential feature is the selection of rays having a frequency corresponding to the rate of vibration of the molecules sought to be affected, and the avoiding of those rays which would influence the molecules which it is desired shall remain unaffected. While it is evident that this principle has a wide range of application in the separation of matters of diverse molecular character, as a practical utilization of this discovery, I may, as an example, apply the same to the separation of moisture from explosives in the course of manufacture, and specifically to the separation of water from phosphorus, sulfur and other ignitible material in the manufacture of matches, where the drying of the product is a very slow proceeding, due to the danger of ignition if any considerable degree of heat be used. I have found by experiment that, in this case, the rays having a wave length and frequency best adapted to exert a sympathetic influence upon the water molecules and impart a synchronous vibration thereto, while tending to retard the molecular vibration of the other molecules, are produced by a red light or by those colors of the spectrum immediately adjacent thereto, and that, by the subjection of the matches to the influence of such rays, evaporation of the moisture is greatly facilitated and a very quick drying attained. Experiments have demonstrated that under such circumstances the drying is accomplished in a much shorter time than when carried on in a white light or in the dark, and that a temperature may be safely used much higher than would, under other conditions, result in the ignition of the matches.

The application of heat is secondary in the desiccation of articles according to the present invention, but its incidental and concurrent effect may in many instances be utilized to advantage. In any case, it is desirable that the radiations shall be as evenly distributed as practicable and that the character of rays shall also be as nearly as possible uniform in wave length and periodicity.

The even distribution of the radiation over the articles to be treated may be provided for in any known way, and rays of a definite wave length and frequency may within certain limits be attained by the breaking up of white light by means of a prism, or by a filter, or the like.

As hereinbefore indicated, my invention is not limited to the application of my discovery to the drying of matches, nor even to the desiccation of matter generally, but is applicable to the segregation of the dissimilar constituents of mixtures generally, the basic feature being that mixtures of matter whose molecules have different ranges and periods of vibration are separated by acting sympathetically upon the molecules of certain ingredients only, by means of selected rays having a wave impulse synchronizing therewith.

Having thus fully described my invention what I claim as new and desire to secure by Letters-Patent of the United States is:

1. The method of eliminating moisture, which consists in subjecting the matter to be desiccated to the dominating influence of selected light-rays having a wave impulse substantially synchronous with the molecular vibration of water.

2. The method of drying matches, which consists in subjecting the wet product to the dominating influence of selected light rays having a wave impulse substantially synchronous with the molecular vibration of water and out of synchronism with the ignitible ingredient of the matches.

In testimony whereof I hereunto affix my signature in the presence of two witnesses.

ARTHUR JUNGHANS.

Witnesses:
ERNST EUTTERMAN,
WM. HAHN.